Feb. 13, 1923.

R. B. HALL.
AUTOMOBILE EXTRACTOR.
FILED NOV. 22, 1921.

1,445,509.

R. B. Hall, Inventor

Geo. P. Kimmel, Attorney

Patented Feb. 13, 1923.

1,445,509

UNITED STATES PATENT OFFICE.

RICHARD B. HALL, OF MADISON, WISCONSIN.

AUTOMOBILE EXTRACTOR.

Application filed November 22, 1921. Serial No. 517,092.

*To all whom it may concern:*

Be it known that I, RICHARD B. HALL, a citizen of the United States, residing at Madison, in the county of Dane and State of Wisconsin, have invented certain new and useful Improvements in an Automobile Extractor, of which the following is a specification.

This invention relates to motor vehicle extractors or crabs to adapt the vehicle by means of its own power to extricate itself from mud, sand or any other place where the driving wheels of the machine are unable to obtain the necessary traction on the road surface.

The object of the invention is to provide a drum for winding up the pulling cable which may be quickly applied to a wheel for emergency use and which may if desired be allowed to remain on the wheel and the cable only removed and carried in the car ready for use when necessary.

Another object is to provide a device of this character which while simple and cheap to manufacture is strong and durable and will last indefinitely since there are no fragile parts to be broken.

Another object is to provide a drum of this character composed of separably connected parts which may be readily disassembled and compactly packed to occupy a minimum amount of space in a car tool box.

With these and other objects in view, the invention consists in certain novel features of construction as hereinafter shown, described and claimed.

Figure 1:
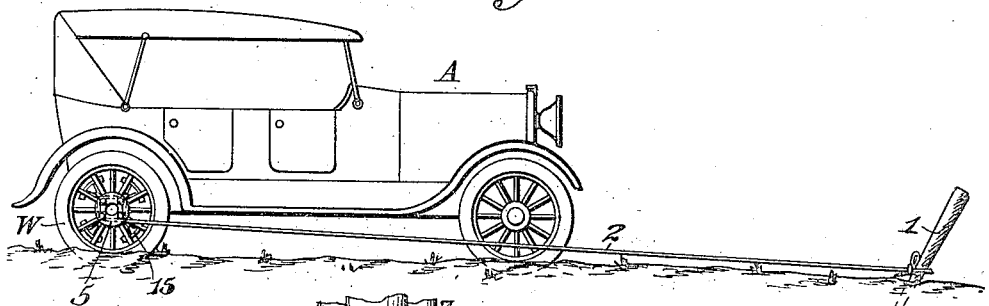
Figure 1 represents a side elevation of an automobile with this improved extractor shown applied.

In the embodiment illustrated the device is shown applied to an automobile A, having the usual traction wheels as W, and to one of which the device constituting this invention is designed to be attached.

The extractor includes a stake 1, to be driven into the ground in advance of the car and to which one end of a cable 2, is designed to be attached, the other end of said cable being attached to a drum 5, mounted on one of the rear or traction wheels W.

The drum 5 is composed of a plurality of spoke engaging elements and a pair of annular end plates. The spoke engaging elements and annular end plates are detachably connected together. The annular end plates will be hereinafter referred to. Any desired number of spoke engaging elements can be employed, and by way of example, four of such elements are illustrated, and which are indicated by the reference characters, 6, 7, 8 and 9. Each of the spoke engaging elements, is similar in construction, and only one will be described, as the description of one applies to the others.

Figure 2:
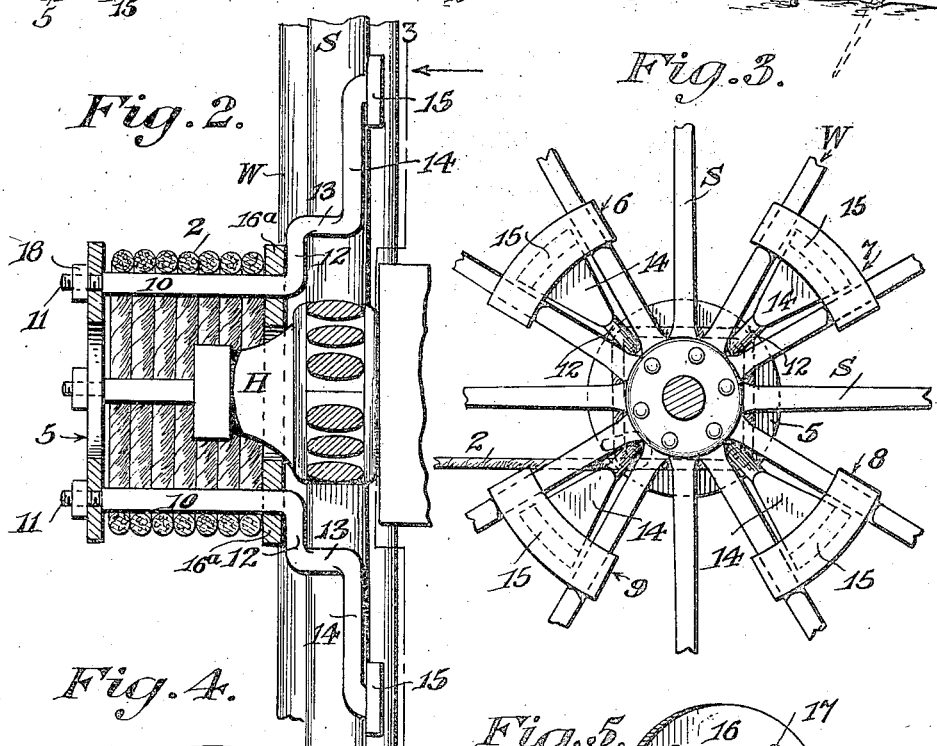
Fig. 2 is a transverse vertical section through a wheel adjacent the hub showing this improved extractor applied with the cable wound on the drum thereof.
Figure 3:
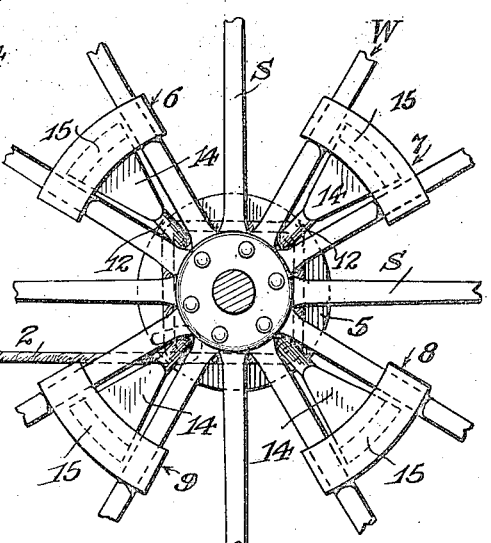
Fig. 3 is a section taken on the line 3—3 of Fig. 2.
Figure 4:
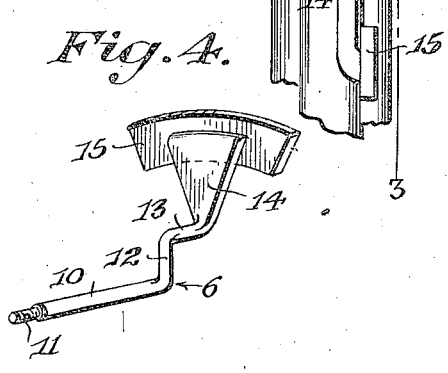
Fig. 4 is a detail perspective view of one of the drum members detached.
Figure 5:
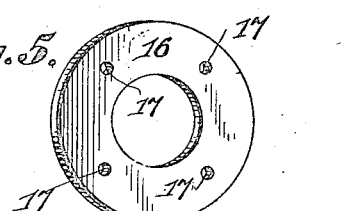
Fig. 5 is a face view or front elevation of the plate used for securing the parts together.

Each of the spoke engaging elements comprises a horizontally disposed rod portion 10, formed with a reduced threaded extension 11, at its outer end. At the inner terminus of the rod portion 10, an L-shaped carrier is formed integral therewith, which comprises a laterally extending arm 12 and a horizontally disposed arm 13. The carrier is disposed at right angles with respect to the rod portion 10, and the arm 12 of the carrier is formed integral with the inner terminus of the rod portion 10. Formed integral with the arm 13 of the carrier, is the smaller end of a sector shaped positioning plate 14, which is adapted to fit between a pair of the spokes S, of the wheel W, as shown in Fig. 3, for the purpose of positioning the spoke engaging element with respect to the pair of spokes. The plate 14 is disposed at right-angles with respect to the arm 13, and has its larger end offset slightly, and the said offset portion projects rearwardly with respect to the plate 14, and is secured to a segmental shaped gripping plate 15. The plate 15 is adapted to be positioned on the inner face of the wheel and engaged with two adjacent spokes, as is shown in Fig. 3. When the plate 15 is arranged in the manner as stated, the plate 14 will be positioned between a pair of spokes, and with the arm 12 of the carrier arranged flush with the outer faces of the spokes, as is shown in Fig. 2.

The annular end plates are indicated at 16 and 16ª and each of which is provided with equidistant apertures 17, and the number of these apertures correspond in number to the number of spoke engaging elements. The plate 16 is mounted on the reduced threaded extension 11 of the spoke engaging elements, and the plate 16ª is mounted against the arm 12 of the carrier. The reduced threaded extensions 11, of the rod portion 10, project through the apertures 17, of the plate 16, and the end plate 16 and rod portion 10, are connected together by means of a nut 18. The openings 17, provided in the end plate 16ª are of larger diameter than the openings 17, in the end plate 16. This provision is made, in view of the diameter of the rod portion 10 with respect to the reduced extensions 11.

In the application of the device, the members 6, 7, 8 and 9 are positioned by inserting their plates 15, between the two spokes with which the member is to be engaged, at a point near the felly where the spokes are farthest apart, after which the sector-shaped plates 14, are slipped down between the spokes into the position shown in Fig. 3. After the device has been so applied, the cable 2 is attached to any one of the spoke engaging elements of the drum, and is then wound once around the drum, so that it will equalize the pull on the respective elements. The cable is then extended to its limit and secured to a suitable anchor, here shown in the form of a stake 1, which has been driven into the ground at a point in advance of the car. The driver then starts the car slowly and the cable will wind up on the drum and pull the car forward to the point where the cable is attached. If necessary, the cable may then be released and attached to another object still further ahead or the stake removed and planted at a suitable point.

If desired, the cable only may be detached from the drum and the drum allowed to remain on the wheel, but is preferable that it be removed, which is accomplished by unscrewing the nuts 18, taking off the plate 16, and then removing the spoke engaging elements 6, 7, 8 and 9, by slipping them out from between the spokes.

From the above description it will obvious that no fasteners for engagement with the spokes are necessary in attaching this device and therefore all danger of marring of the wheels is avoided since if desired, the plate 15 may be suitably lined to avoid abrasion of the paint on the spokes.

What is claimed is:

1. An extractor of the class described, comprising a plurality of drum forming members, each consisting of a rod having at its inner end an offset sector-shaped element to fit between two spokes adjacent to the hub of the wheel to which the device is to be connected, and a transversely arranged segmental plate carried by said element, the outer ends of said rods being reduced and threaded, and a plate mounted on and apertured to receive said reduced ends, and nuts engaged with the reduced ends for securing the plate to the rods.

2. A device of the class described, comprising a plurality of drum forming and spoke engaging elements, each consisting of a rod reduced and threaded at its outer end, an annular plate apertured to receive said reduced ends, means for securing said plate on said ends, the inner ends of said rods each having a laterally extending L-shaped portion provided with an outwardly extending sector-shaped plate mounted thereon, and a segmental plate mounted transversely of and connected with the said sector-shaped plate and adapted to engage the inner faces of a pair of wheel spokes to hold the device engaged with the wheel.

3. A device for the purpose set forth comprising a plurality of drum forming and spoke engaging elements each consisting of a rod having its inner end formed with a carrier, a sector shaped positioning element integral with the carrier, and a segmental shaped gripping element disposed transversely of and integral with the outer end of the positioning element, said gripping element offset with respect to said positioning element.

4. A device for the purpose set forth comprising a plurality of drum forming and spoke engaging elements each consisting of a rod having its inner end formed with a carrier, a sector shaped positioning element integral with the carrier, and a segmental shaped gripping element disposed transversely of and integral with the outer end of the positioning element, said gripping element offset with respect to said positioning element, an annular end plate connected with the outer end of said rod, and an inner end plate mounted on the rod and positioned in proximity to the carriers.

5. A device for the purpose set forth comprising a plurality of drum forming and spoke engaging elements, each of said elements consisting of a rod provided at its inner end with a carrier, a positioning element integral with said carrier, a gripping element disposed transversely of the positioning element, integral therewith and offset with respect thereto, and end plates mounted on said rod.

In testimony whereof, I affix my signature hereto.

RICHARD B. HALL.